United States Patent [19]

Tang

[11] Patent Number: 5,353,641
[45] Date of Patent: Oct. 11, 1994

[54] DIGITAL CAPACITIVE ACCELEROMETER

[75] Inventor: William C. Tang, Ann Arbor, Mich.

[73] Assignee: Ford Motor Company, Dearborn, Mich.

[21] Appl. No.: 925,828

[22] Filed: Aug. 7, 1992

[51] Int. Cl.$^5$ .......................................... G01P 15/125
[52] U.S. Cl. ................................................. 73/517 R
[58] Field of Search ............... 73/517 R, 1 D, 862.626; 324/661

[56] References Cited

U.S. PATENT DOCUMENTS

| | | | |
|---|---|---|---|
| 3,911,738 | 10/1975 | Fischer | 73/141 |
| 4,553,436 | 11/1985 | Hansson | 73/517 R |
| 4,641,539 | 2/1987 | Vilimek | 73/517 R |
| 5,095,752 | 3/1992 | Suzuki et al. | 73/517 R |
| 5,243,861 | 9/1993 | Kloeck et al. | 73/517 R |

OTHER PUBLICATIONS

"The Resonant Gate Transistor", IEEE Trans. Electron Devices, vol. Ed-14, pp. 117-133, 1967, Nathanson et al.

Primary Examiner—Richard E. Chilcot, Jr.
Assistant Examiner—Joseph L. Felber
Attorney, Agent, or Firm—Roger L. May; Allan J. Lippa

[57] ABSTRACT

A digital capacitive accelerometer is disclosed as having a fixed plate mounted on a support member and a sprung plate resiliently mounted in spaced relationship to the fixed plate to form a capacitor. A voltage is connected across the plates to establish an electrostatic force that pulls the sprung plate toward the fixed plate. The voltage is incrementally increased, pulling the sprung plate incrementally toward the fixed plate. When a pull-in voltage level is reached, the electrostatic force is of sufficient magnitude to abruptly pull the sprung plate across the remaining distance separating it from the fixed plate, and a pull-in detection signal is generated by detecting a current pulse as the gap collapses. The plates are then released, and another incrementing cycle is initiated. The pull-in voltage is a function of the initial capacitor gap which in turn is determined by the acceleration the device is experiencing. Since detection of the current pulse is easy, the accelerometer is therefore substantially more sensitive than inertial types of accelerometers, and a generated signal representative of the number of times the voltage is increased is also representative of the acceleration force applied.

19 Claims, 6 Drawing Sheets

DIGITAL CAPACITIVE ACCELEROMETER

TECHNICAL FIELD

This invention relates generally to accelerometers and, more particularly, to a capacitive accelerometer having a resiliently mounted capacitor plate electrostatically attracted toward an associated fixed plate.

BACKGROUND ART

A device for measuring forces that displace a capacitor plate with respect to one or more fixed capacitor plates is shown in U.S. Pat. No. 3,911,738, issued to Fischer. As a force displaces the movable plate, a responsive displacement signal is used to generate differential electric pulses that indicate the amplitude of the force being measured and that, when applied to the capacitor, electrostatically oppose the force and urge the movable plate toward its original position.

The Fischer apparatus uses an elaborate capacitive bridge circuit to measure voltage level changes caused by deflection of the plate. When the electrostatic counterbalancing force is generated to restore the plate, displacement is reduced by the generated counterbalancing force and thus, even more difficult to detect.

The use of analog voltage levels is susceptible to noise, especially switching noises inherent in the oscillator and phase-sensitive rectifier of the device. To improve the signal-to-noise ratio of the device, the movable plate must be sufficiently large to generate a detectable signal difference for small displacements. Furthermore, the noise susceptibility, particularly of the capacitive bridge circuit, substantially precludes system miniaturization; therefore, relatively expensive conventional hybrid technology must be used to fabricate the force-sensing elements. In addition, proper operation of the Fischer apparatus requires that it avoid rather than allow a pull-in condition.

Publication "The Resonant Gate Transistor" IEEE Trans. Electron Devices, Vol. Ed-14, pp. 117-133, 1967 by Nathanson et al. describes a pull-in phenomenon as an undesirable characteristic of a resonant gate transistor. The phenomenon is exhibited by a parallel-plate capacitor having one plate suspended with a spring and a fixed plate. An applied voltage across the two plates induces an electrostatic force which tends to pull the spring-supported plate to the fixed plate. The capacitor gap gradually decreases with increasing voltage until a threshold voltage at which the gap collapses and the plates remain latched until the applied voltage is removed. Resonant gate transistors are often used as a tuning device in an oscillator circuit, an application which would not benefit from the pull-in phenomenon.

DISCLOSURE OF THE INVENTION

An object of the present invention is to provide an improved digital accelerometer that is more sensitive, more efficient and less expensive than previously known accelerometers. The accelerometer can periodically generate a voltage signal, the magnitude of which varies in response to a relatively small displacement of a suspended capacitor plate at a predetermined acceleration, dependent upon the dimensions of the plates and other factors discussed hereinafter. Although the accelerometer of the present invention may be presumed to be very sensitive, it offers excellent noise immunity due to the digital nature of signal generation using the pull-in phenomena.

In the preferred embodiment, modern surface micromachining technology can be used to cost-effectively fabricate a miniature version. This miniature version can, for example, be integrated with circuits on a common silicon substrate, thus offering the advantages of further suppressing external noise and reducing material and manufacturing cost.

In general, a digital capacitive accelerometer of the present invention includes a support member having a fixed plate mounted thereto. A sprung plate is positioned by a biasing member at a location in spaced relationship to the fixed plate and is capable of linear translation with respect to the fixed plate. Preferably, a plurality of resilient supporting beams extend from mutually equidistant locations on the sprung plate to anchor locations on the support member to support and to resiliently bias the sprung plate toward a rest position in a fixed registration with the opposing plate. Nonetheless, other support means and specific registrations of the plates may be modified without departing from the present invention.

In addition, the movable plate preferably has a large area and thickness that ensures substantial mass so as to react sensitively to movement of the support. However, the larger sprung plate preferably has holes, perpendicular to the large surface area when the plate is displaced perpendicular to the large area, to limit air resistance to movement of the plate in a non-vacuum environment. Preferably, the fixed plate has a different area to maintain capacitance at a reasonable level and may be smaller to compensate for a larger area sprung plate. When a voltage signal is connected across a fixed plate and a sprung plate to establish an electrostatic force, the force urges the sprung plate toward the fixed plate with a force dependent upon the magnitude of the signal voltage.

In a preferred method and apparatus for responding to the pull-in effect of the capacitor plates, a logic control such as a microprocessor, drives a counter to incrementally increase a control signal delivered to a digital-to-analog converter that outputs the voltage applied to the capacitive switching device. When the applied voltage reaches the threshold that pulls the sprung plate against the fixed plate, the current pulse generated is used to latch the control signal registering with the applied voltage signal as an indication of the acceleration force imposed upon the switching device. The plates are then released by resetting the counter to zero, and another incrementing cycle is initiated. Since the magnitude of external force determines the initial displacement of the sprung plate from its resting position, which in turn determines the magnitude of the threshold voltage required to pull in the sprung plate, the incremented voltage at pull-in is representative of the acceleration force.

A preferred arrangement of accelerometers according to the present invention permits a higher sampling rate. Since the time required for an incrementing cycle is finite and should be substantially longer than the mechanical time constant of the suspended plate to avoid exciting resonance, a plurality of digital capacitive accelerometers are paralleled. Output signals from each are multiplexed in time-phased relationship and then processed to generate an output signal representative of the acceleration force and based upon more frequent sampling than a single accelerometer.

These and other objects and advantages of the present invention will be readily apparent from the following detailed description of the best mode for carrying out the invention when read in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
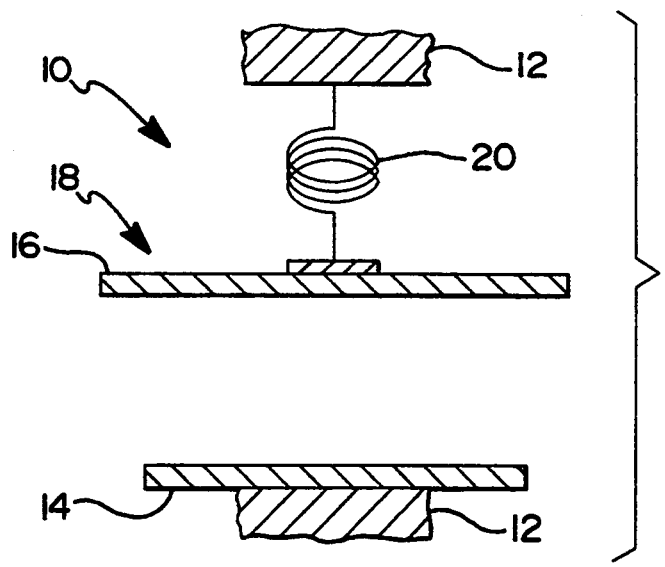
FIG. 1 is a simple representation of the capacitive switching device of the digital accelerometer of the present invention, the switching device being shown in its rest position.

FIG. 1 of the drawings is a diagrammatic representation of a capacitive switching device, generally indicated by the reference numeral 10, of a digital accelerometer of the present invention. The accelerometer switching device 10 includes a support member 12 and a fixed plate 14 mounted thereto. A sprung plate 16 is supported by a resiliently biasing member, diagrammatically shown as spring 20. The resiliently biasing member may be any means for movably supporting the plate 16 at a relatively fixed position, but in the preferred embodiment of FIG. 6 comprises a biased beam 24. The registering plates 14 and 16 form a capacitor, generally indicated by reference numeral 18. The sprung plate 16 is capable of linear translation with respect to the fixed plate 14 when subjected to an acceleration force. When no forces are acting on the sprung plate 16, the spring 20 maintains it in a rest position defining a specific gap between the sprung plate 16 and the fixed plate 14.

Figure 2:
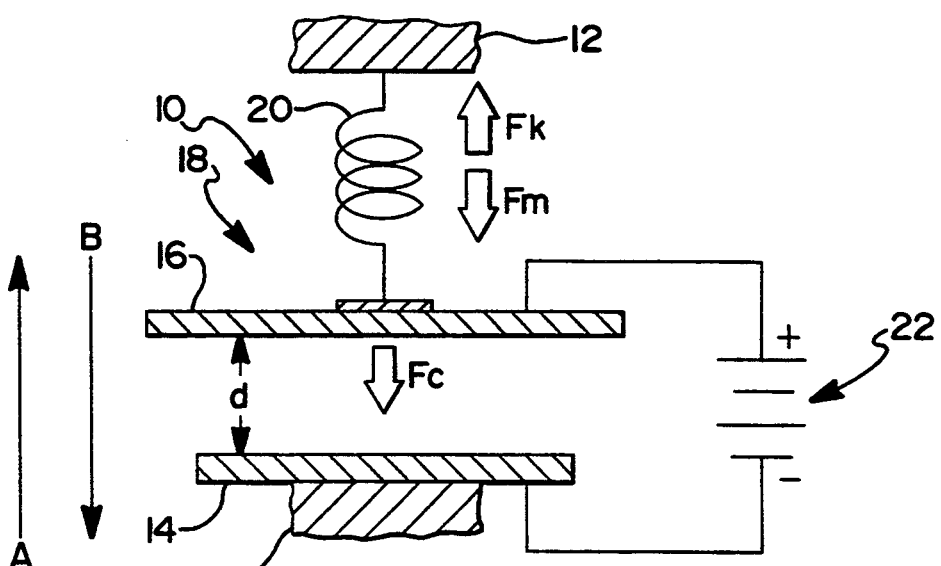
FIG. 2 is a view similar to that of FIG. 1 and shows the switching device in a partially actuated position.
Figure 3:
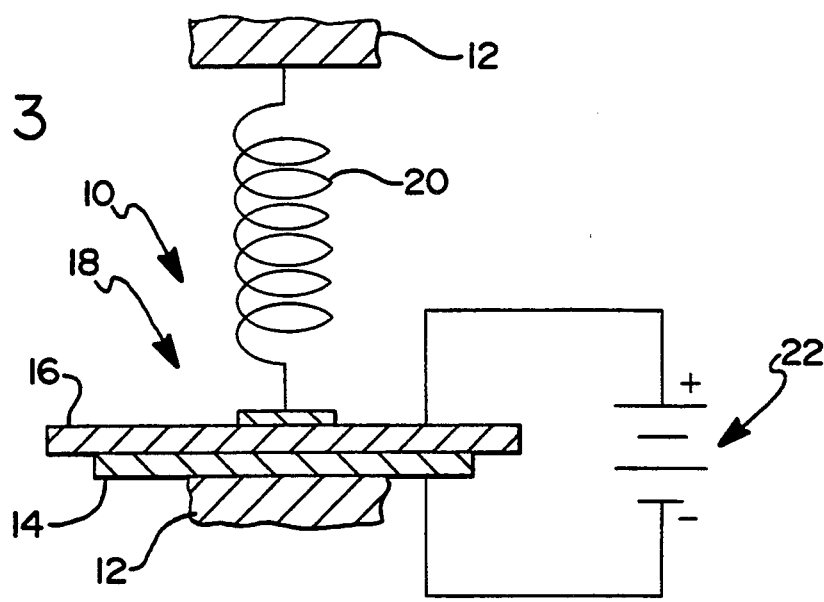
FIG. 3 is a view similar to that of FIG. 1 and shows the switching device in a fully actuated position.

As shown in FIG. 2 of the drawings, a source of voltage, diagrammatically represented by a battery 22, is connected across the fixed plate 14 and sprung plate 16. The source applies an electrical potential difference, or voltage, across the plates 14 and 16 to establish an electrostatic field that mutually attracts the plates 14 and 16. Since the fixed plate 14 is mounted on the support member 12, it is not free to move. If the applied voltage is of sufficient magnitude to partially overcome the resilient bias supporting the plate 16, the sprung plate 16 is drawn toward the fixed plate 14, reducing the gap therebetween by an amount related to the applied voltage. If the voltage from the battery 22 is of sufficient magnitude to completely overcome the resilient supporting bias, as well as any force due to movement of the switching device in the direction of plate displacement, the sprung plate 16 is drawn against the fixed plate 14 as shown in FIG. 3 of the drawing.

With reference again to FIG. 2, a force applied to the capacitive switching device 10 in a direction indicated by arrow A accelerates the fixed plate 14 toward the sprung plate 16. Similarly, if the switching device 10 is moving in a direction indicated by arrow B, and decelerated by braking or a collision, inertia causes the sprung plate 16 to continue moving toward the fixed plate 14. In both instances, the sprung plate 16 is effectively accelerated toward the fixed plate 14 under the influence of a force $F_m$.

As shown, the force $F_m$ is opposed by a force $F_k$ applied by the spring 20 and is aided by an electrostatic force $F_c$, attracting the sprung plate 16 toward the fixed plate 14 and reducing the gap therebetween. This relationship can be expressed by the following mathematical equation.

$$F_m = F_k - F_c \qquad (1)$$

If sufficient force $F_m$ is applied, it and the electrostatic force $F_c$ overcome the opposing force $F_k$ of the spring 20; and the sprung plate 16 and the fixed plate 14 are forced together as shown in FIG. 3. Qualitatively, the higher the external force $F_m$ in the direction toward the fixed plate, the lower the electrostatic force $F_c$ required to effect a pull-in, and thus the lower the required pull-in voltage. This inverse relationship between the external force and the pull-in voltage is the preferred operation of this invention. Nevertheless, it will also be understood that a higher force in a direction away from the fixed plate will require a higher voltage to effect a pull-in.

The three forces acting on the sprung plate 16 can be defined by the following equations.

$$F_m = Ma \qquad (2)$$

$$F_k = k(d_0 - d) \qquad (3)$$

$$F_c = \frac{1}{2} \frac{\epsilon A}{d^2} V_c^2 \qquad (4)$$

In the foregoing equations, $\epsilon$ is the permittivity ($8.854 \times 10^{-12}$ F·m$^{-1}$), A is the effective capacitor plate area, M is the effective mass of the sprung plate, k is the spring constant of the supporting flexures, d is the gap between capacitor plates, $d_0$ is the gap under zero electrostatic bias and zero acceleration, a is acceleration, and $V_c$ is the applied voltage.

Substituting equations (2), (3) and (4) into equation (1) and rearranging terms yields the following equation.

$$\left[ d_0 - \frac{Ma}{k} - d \right] d^2 = \frac{\epsilon A}{2k} V_c^2 \quad (5)$$

$$\left[ 1 - \frac{Ma}{kd_o} - \frac{d}{d_o} \right]^{\frac{1}{2}} \left[ \frac{d}{d_o} \right] = \left[ \frac{\epsilon A}{2kd_o^3} \right]^{\frac{1}{2}} V_c$$

Figure 4:
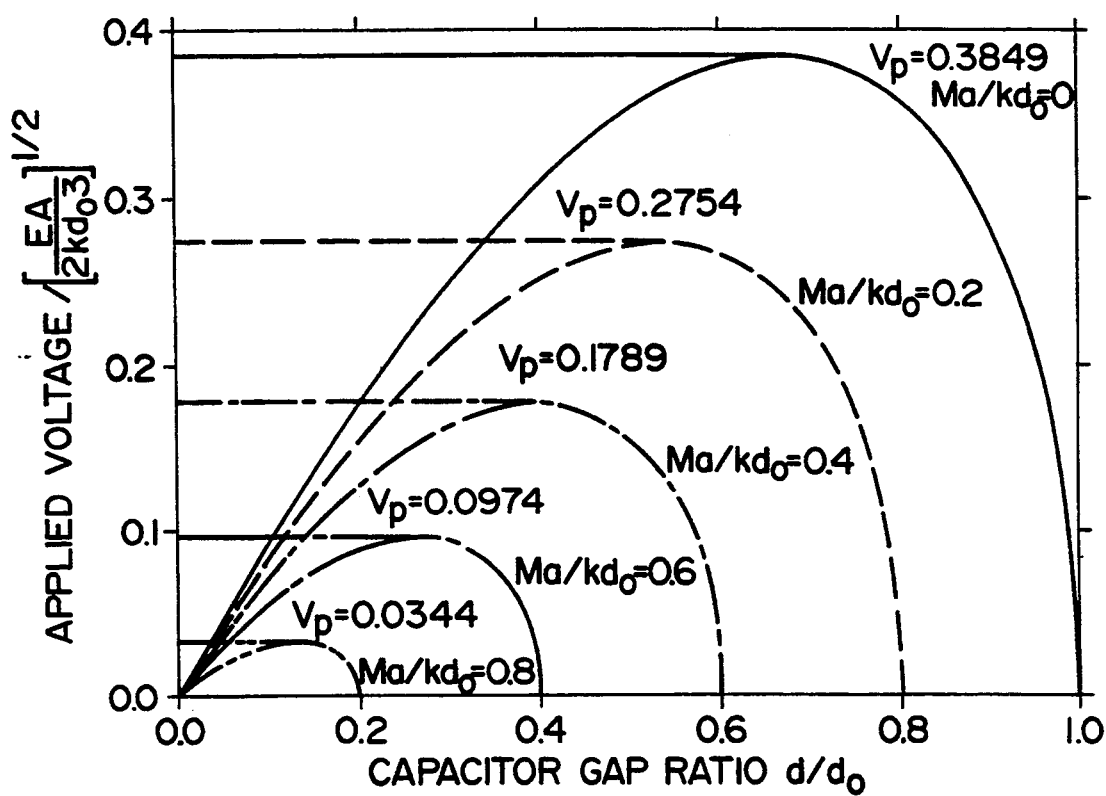
FIG. 4 is a normalized graphic representation of the relationship between the gap between capacitor plates of the switching device and the voltage applied across the plates.

FIG. 4 is a graphic representation of examples of the relationship between the applied voltage $V_c$ scaled with the constant $$\sqrt{(\epsilon A/2kd_o^3)}$$

and the capacitor plate gap ratio $d/d_o$ for a number of values of $Ma/kd_o$. As shown, when the applied voltage $V_c$ is increased, the electrostatic force generated pulls the sprung plate 16 toward the fixed plate 14, decreasing the gap d. For example, if the external force on the device is zero, such that $(Ma/kd_o)=0$, the initial gap d under zero applied voltage is the nominal resting capacitor gap $d_o$. When the applied voltage $V_c$ is increased toward a value of $$0.3849 \times \sqrt{(2kd_o^3/\epsilon A)} ,$$

the sprung plate 16 is pulled toward the fixed plate 14. Upon reaching an applied voltage $V_c$ value of $$0.3849 \times \sqrt{(2kd_o^3/\epsilon A)} ,$$

the biasing force $F_k$ of the spring 20 is completely overcome, and the sprung plate 16 is abruptly pulled into contact with the fixed plate 14, decreasing the gap d therebetween to zero. The voltage at this point is referred to as the pull-in voltage $V_p$.

If the device is experiencing an acceleration a of the magnitude of $0.2 \times (kd_o/M)$, the initial gap d under zero applied voltage is reduced to $0.8d_o$. When the applied voltage $V_c$ is increased toward a value of $$0.2754 \times \sqrt{(2kd_o^3/\epsilon A)} ,$$

the sprung plate 16 is pulled toward the fixed plate 14. Upon reaching an applied voltage $V_c$ value of $$0.2754 \times \sqrt{(2kd_o^3/\epsilon A)} ,$$

the biasing force $F_k$ of the spring 20 is completely overcome, and the sprung plate 16 is abruptly pulled into contact with the fixed plate 14, decreasing the gap d therebetween to zero. The pull-in voltages are plotted for a number of other values of $Ma/kd_o$.

An equation for calculating the pull-in voltage $V_p$ is:

$$V_p = \left[ \frac{2}{3} \right]^{\frac{3}{2}} \left[ \frac{k}{\epsilon A} \right]^{\frac{1}{2}} \left[ d_0 - \frac{Ma}{k} \right]^{\frac{3}{2}} \quad (12)$$

Figure 5:
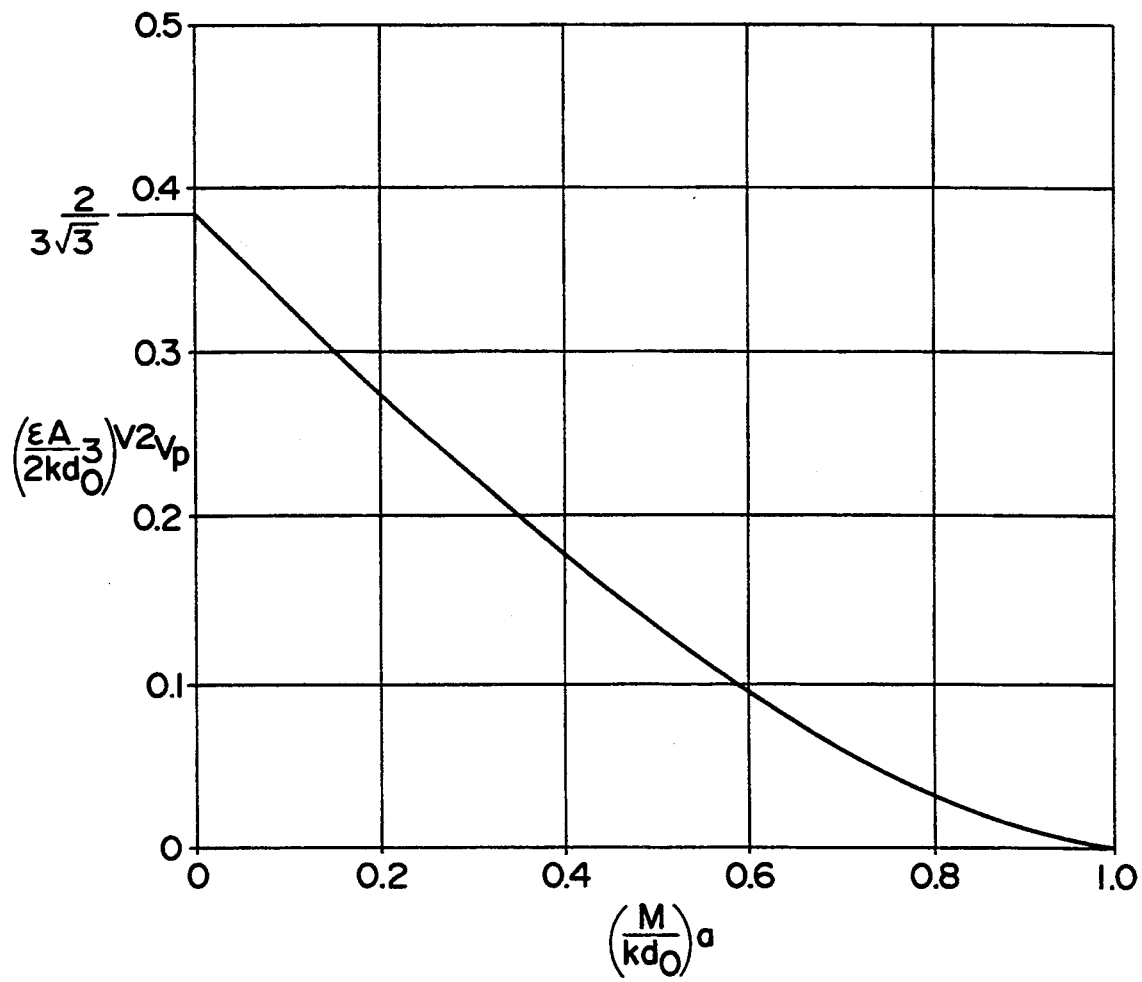
FIG. 5 is a normalized graphic representation of the relationship between the pull-in voltage of a switching device capacitor plate and the external acceleration force for a given spring constant, mass, and nominal resting capacitor gap.

FIG. 5 is a normalized graphic representation of the relationship between the pull-in voltage $V_p$ scaled with the constant $$\sqrt{(\epsilon A/2kd_o^3)}$$

of the switching device capacitor and the scaled acceleration $Ma/kd_o$.

Figure 6:
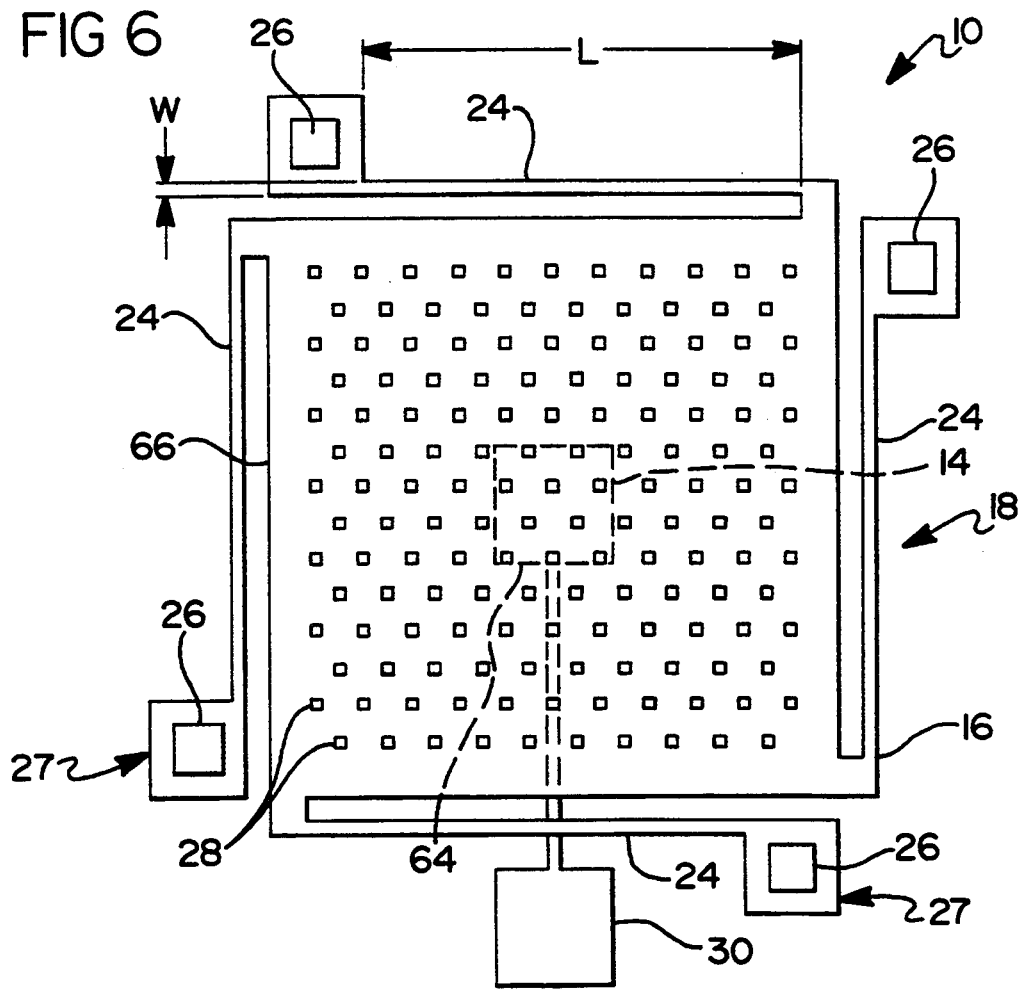
FIG. 6 is a front view, partially in phantom, of the switching device of the digital capacitive accelerometer of the present invention.
Figure 7:
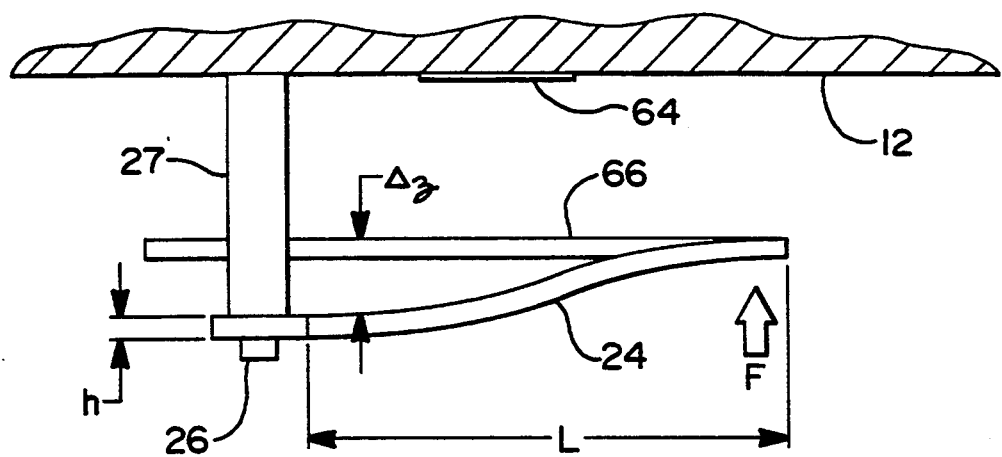
FIG. 7 is a top view of a supporting beam, the dimensions of which are shown in exaggerated proportions, of the switching device of the present invention, the supporting beam and the sprung plate being shown in a displaced position.

FIG. 6 of the drawings is a front view of a preferred switch structure for surface-micromachined polysilicon accelerometer design. As shown in FIGS. 6 and 7, the switching device 10 is constructed with a parallel-plate capacitor 18. The capacitor includes a fixed plate 64 mounted on a support member 12. A sprung plate 66 is disposed in spaced relationship to the fixed plate 64 and forms a capacitor. In the preferred embodiment, the large area surfaces of the plates 64 and 66 face each other to form the switching device 10. The fixed plate 64 and the sprung plate 66 of the preferred embodiment shown have a rectangular, and preferably square, configuration.

Figures 10A, 10B, 10C, 10D:
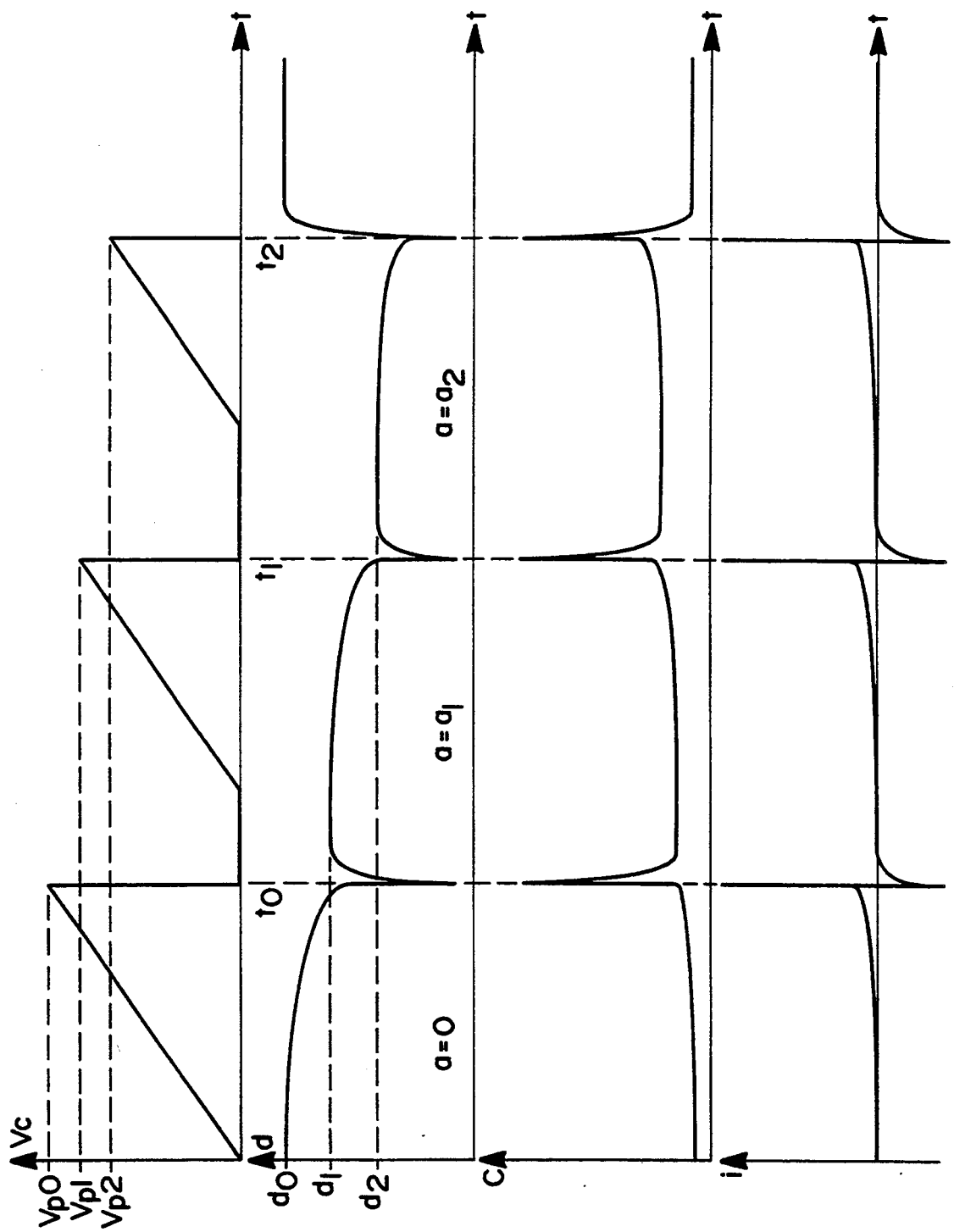
FIG. 10 is a graphic representation of performance parameters for an accelerometer of the present invention.

The sprung plate 66 is mounted to the support member 12 by resilient biasing means in the form of a resilient supporting beam 24 extending from each of the four corners of the sprung plate 66. Each beam 24 extends along an adjacent edge of the plate 66 toward an adjacent corner. At the adjacent edge, each supporting beam 24 is secured to the support member 12 by anchors 26 on raised posts 27 (FIG. 7). In the preferred embodiment, the supporting beams 24 are continuous extensions of sprung plate 66, although the capacitor 18 may be constructed with substantially different plates, biasing members and supports without departing from the scope of the present invention. The supporting beams 24 normally maintain sprung plate 66 in a rest position, defining a specific gap $d_0$ between the sprung plate 66 and the fixed plate 64. This specific arrangement of four supporting beams provides compactness and constrains the motion of the sprung plate to the preferred direction. FIG. 10 of the drawings shows the amplitude versus time relationship between pull-in voltage, capacitor plate gap, capacitance and current for several values of acceleration.

If the capacitor 18 is to be operated in a nonvacuum, apertures 28 are formed in the sprung plate 66 to provide interrupted areas of mass to mitigate the effects of squeeze-film damping between the sprung plate 66 and the fixed plate 64. Sufficient damping must be maintained to prevent "ringing" when a force is applied to the sprung plate 66, but not enough to adversely inhibit rapid translation of the sprung plate 66 toward the fixed plate 64 when a pull-in voltage is applied across the capacitor 18. The apertures 28 in the sprung plate 66 contribute significantly to the linearity of the relationship between the pull-in voltage $V_p$ and $Ma/k$ as illustrated by FIG. 5. Alternatively, a fixed plate of other configuration may also provide interrupted areas that avoid excessive damping and also contribute to the linearity of the relationship between the pull-in voltage $V_p$ and $Ma/k$. A contact terminal 30 is coupled to fixed plate 64 and a similar contact terminal may be provided on plate 66, a supporting beam 24 or an anchor 26.

Preferably, the sprung plate 66 has a substantially larger area than the fixed plate 64 to provide larger mass to make the switching device more sensitive to acceleration. The fixed plate has a smaller area to limit the capacitance between the plates to a reasonable amount despite the size of the sprung plate.

The preferred embodiment of the plates employs surface-micromachining using polysilicon as a thin-film structural material. The gap between the sprung plate 66 and the fixed plate 64 when the former plate is in its rest position is between 2 and 10 $\mu$m, but the nominal capacitor gap $d_0$ in the preferred embodiment is determined by the thickness of a sacrificial phosphosilicate glass (PSG) layer used during fabrication, which can be as thick as 3 $\mu$m to provide a practical polysilicon film thickness also about 3 $\mu$m. The total plate area $A_p$ can be calculated using the polysilicon density $\rho$ (2.3×10³ kg·m⁻³) and the required mass M. The length L and width W of the four supporting beams 24 are determined by the desired spring constant k.

As an example, one might wish to design an accelerometer switching device 10 that actuates with a pull-in voltage $V_p$ of 5 volts when there is no accelerating force applied thereto and actuates with no pull-in voltage when there is a full-scale acceleration force of 20 g. Letting the plate gap $d_0$ under zero electrostatic bias and zero acceleration equal 3 $\mu$m and the polysilicon thickness h equal 3 $\mu$m, substituting the first constraint of the design goal into equation (6) and rearranging terms provides the following value for k/A.

$$\frac{k}{A} = 2.7669 \times 10^{-5} \frac{\mu N \cdot \mu m^{-1}}{\mu m^2} \tag{14}$$

Substituting the second constraint of the design goal into equation (6) and rearranging terms provides the following value for M/k.

$$\frac{M}{k} = 1.5306 \times 10^{-8} \frac{kg}{\mu N \cdot \mu m^{-1}} \tag{15}$$

Letting the sprung plate area $A_p$ be 1 mm by 1 mm, the mass M can be calculated in the following manner.

$$M = A_p h \rho = 6.9 \times 10^{-9} kg \tag{16}$$

Substituting the result M of equation (11) into equation (7) provides the following value for k.

$$k = 0.4508 \ \mu N \cdot \mu m^{-1} \tag{17}$$

Substituting the result k of equation (12) into equation (9) provides the following value for A.

$$A = 128 \ \mu m \times 128 \ \mu m \tag{18}$$

Finally, to achieve a total spring constant k of 0.4508 $\mu$N·$\mu$m⁻¹, each of the four supporting beams 24 must have a spring constant $k_0$ of k/4, or 0.1127 $\mu$N·$\mu$M⁻¹. A spring constant can be calculated in the following manner.

$$k_0 = \frac{24EI}{L^3}, \text{ where } I = \frac{h^3 W}{12} \tag{19}$$

$$= \frac{2Eh^3 W}{L^3}$$

In the foregoing equation, E is Young's modulus (150 GPa), W and L (FIG. 6) are the respective width and length of each supporting beam 24 and h is the thickness of the supporting beam as shown FIG. 7. FIG. 7 of the drawings is a top view of a supporting beam 24, the dimensions of which are shown in exaggerated proportion. The supporting beam is shown as it would appear when the sprung plate 16 is in a displaced position.

Since $k_0$ is known to be k/4, if 10 $\mu$m is chosen as the width W of a supporting beam 24, the length L of the supporting beam 24 can be calculated by substituting k/4 into the previous equation and rearranging terms.

$$L = \left[ \frac{2Eh^3 W}{(k/4)} \right]^{\frac{1}{3}} = 896 \ \mu m \tag{20}$$

Accelerometers such as that of the present invention can be used for many applications simply by choosing suitable values for parameters. Typical applications include as sensors for the actuation of vehicle air bags, where the acceleration range is typically within a range of 0 to 50 g and as sensors for monitoring suspensions, where the acceleration range might be 0 to 1 g. Yet another application is as sensors for the early detection of engine vibrations signaling a problem. For example, an improper fuel-air mixture that causes debilitating "engine knocks" that cause engine damage may be detected early by sensing the vibration before it escalates to a harmful knock that could be detected by less sensitive means.

Figure 8:
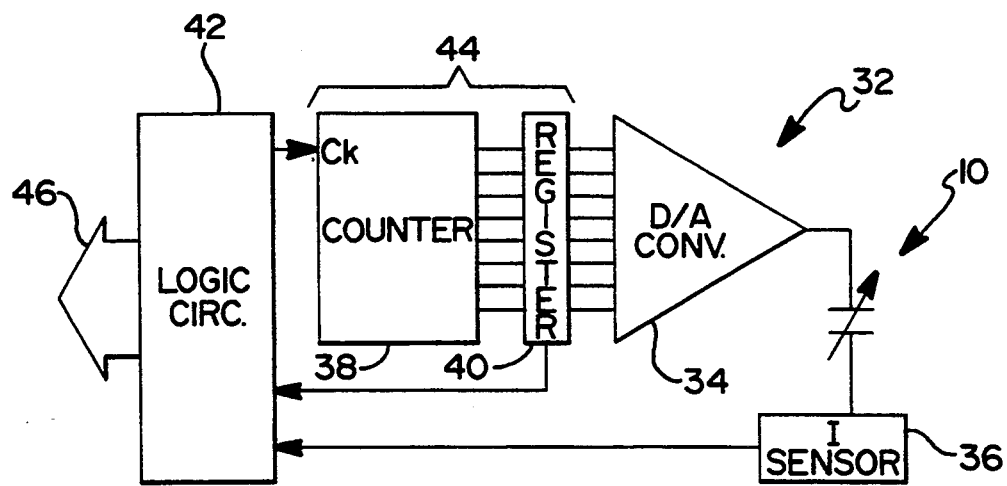
FIG. 8 is a schematic representation of a digital capacitive accelerometer, including the switching device, of the present invention.

FIG. 8 of the drawings shows a preferred embodiment of a digital capacitive accelerometer 32. The accelerometer 32 provides means for sensing the current peak at the pull-in voltage of the accelerometer switching device 10 and provides a pulse as a digital signal output of the pull-in phenomenon.

The accelerometer 32 of the preferred embodiment includes the accelerometer switching device 10, a digital-to-analog converter 34, a current sensor circuit 36, a counter 38, a register 40, and a logic control circuit 42. The counter 38 and register 40 form an incrementing circuit 44 for the applied voltage source. A converter 34 generates the voltage applied to the accelerometer switching device 10, such as capacitor 18 (FIG. 2). The counter 38 increments the converter 34 so that a monotonically increasing voltage is applied to the capacitor 18 (FIG. 6). When the voltage has increased the electrostatic force between the sprung plate 16 and the fixed plate 14 of the capacitor 18 (FIG. 6) to a level that, when summed with an applied acceleration force, pulls the sprung plate 16 and the fixed plate 14 into contact, the sudden increase in capacitance attending the pull-in results in a substantial current pulse that can easily be detected by the current sensor circuit 36.

When such a pull-in is detected, the digital input to the converter 34 carried at register 40 is input as a digital representation of the pull-in voltage. The logic circuit 42 generates a reset signal to reset the counter 38 to zero. This releases the sprung plate 16 from its position against the fixed plate 14 (FIG. 6), and the counter 38 begins counting again to initiate the next measurement cycle. The logic circuit 42 has a logic circuit digital output 46 comprising digital signals representative of the applied acceleration force. FIG. 10 is the timing diagram of the accelerometer indicating the timing relationships between the applied voltage $V_c$, the capacitor gap d, the capacitance C, and the current i flowing through the capacitor. Three cycles are illustrated. During the first cycle, acceleration is zero and pull-in occurs at time $t_o$, resulting in a pull-in voltage indicated as $V_{P0}$. During the following two cycles, the accelerometer is experiencing acceleration values $a_1$ and $a_2$, respectively, resulting in two corresponding pull-in voltage values of $V_{p\,P1}$ and $V_{P2}$.

The maximum period between register updates is determined by the clock speed of the counter 38 and the number of bits in the digital-to-analog converter 34. The period should be substantially longer than the mechanical time constant of the sprung plate 16 (FIG. 6) to avoid exciting resonance. Accordingly, additional digital capacitive accelerometers 32 can be paralleled to provide a system with a more frequent data output if that is required.

Figure 9:
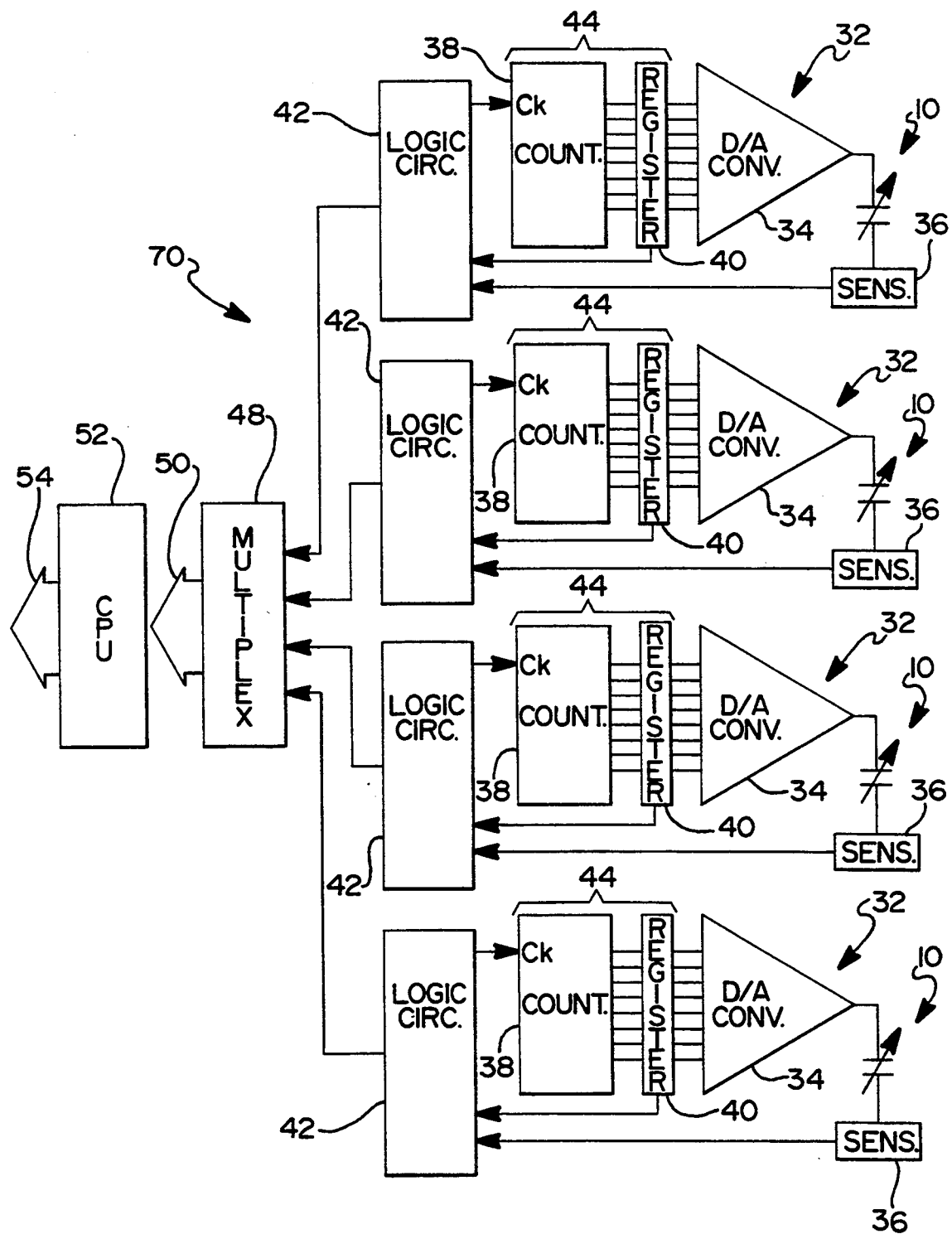
FIG. 9 is a schematic representation of a multiple accelerometer system, including the switching device, of the present invention.

FIG. 9 of the drawings illustrates a preferred embodiment of an improved digital accelerometer system 70. Four digital capacitive accelerometers 32 are shown connected in parallel through a multiplexer 48 to a central processing unit 52. The central processing unit 52 has a CPU digital output 54 comprising digital signals representative of an applied acceleration force. Assuming that it takes a period T to increment each counter 38 from zero to the maximum, the counter 38 of the second digital capacitive accelerometer 32 is delayed by a period T4. Each counter 38 of the third and fourth digital capacitive accelerometers 32 is delayed by periods T/2 and 3T/4, respectively. The overall system output rate is, therefore, proportional to the number of digital capacitive accelerometer systems used.

Of course, it should be obvious to one skilled in the art that a digital capacitive accelerometer or digital multiple capacitive accelerometer systems according to the present invention can be arranged to detect and measure acceleration along any number of axes. Likewise, a plurality of each can be disposed along coincident or parallel axes to measure acceleration in one direction from a number of locations. Such an arrangement finds useful application, for example, on vehicles or other structures where impact, suspension and other forces are absorbed or transmitted more or less effectively in different areas or where redundancy is important.

While the best mode for carrying out the invention has been described in detail, those familiar with the art to which this invention relates will recognize various alternative designs and embodiments for practicing the invention as defined by the following claims.

I claim:

1. A digital capacitive accelerometer comprising:
a support member;
a fixed plate mounted on said support member;
a sprung plate;
resilient means for resiliently supporting said sprung plate to said support member at a rest position in spaced relationship to said fixed plate, and biasing said sprung plate for resisting an externally applied acceleration force;
a source for applying voltage across said fixed and sprung plates;
incrementing means for incrementally increasing the voltage applied across said fixed and sprung plates to incrementally increase the electrostatic force thereacross until a pull-in voltage is reached that is capable of producing an electrostatic force strong enough to overcome the resilient bias of said resilient means and pull said sprung plate against said fixed plate resulting in the generation of a current pulse;
sensing means for sensing the current pulse as a pull-in detection signal;
wherein said incrementing means includes means for generating a representative signal for the voltage level applied across said fixed and sprung plates as said pulse is generated.

2. The accelerometer as defined in claim 1, wherein the mass of said sprung plate is greater than that of said fixed plate.

3. The accelerometer as defined in claim 1, wherein said sprung plate is spaced from said fixed plate and aligned to form a parallel-plate capacitor, said sprung plate being capable of linear translation with respect to said fixed plate in a direction changing the capacitor gap.

4. The accelerometer as defined in claim 3, wherein said sprung plate includes a plurality of apertures for passing ambient fluid from between the plates.

5. The accelerometer as defined in claim 4, wherein said apertures are distributed throughout the area of the plate to maintain damping that suppresses ringing.

6. The accelerometer as defined in claim 5, wherein said fixed plate is aligned in a plane parallel to that of the sprung plate, to assist in maintaining a substantially linear rate of change of voltage with respect to acceleration force.

7. The accelerometer as defined in claim 3, wherein said resilient means comprises a plurality of resilient supporting beams extending from equidistant adjacent locations on said sprung plate to anchor locations on said support member.

8. The accelerometer as defined by claim 7, wherein said sprung plate has a substantially rectangular configuration, each of said beams extending from a different corner and along a different edge of said sprung plate to a position proximate an adjacent corner of said sprung plate and an associated anchor location on said support member.

9. The accelerometer as defined in claim 1, wherein said source provides direct electrical current and comprises a digital-to-analog converter connected to one of said plates of said capacitor.

10. The accelerometer as defined in claim 9, wherein said incrementing means comprises:
a counter for generating an incrementing signal to increment said digital-to-analog converter to monotonically increase the voltage applied to said capacitor; and
a register to register the number of times said analog-to-digital converter has been incremented, the number of increments being representative of the pull-in voltage.

11. A digital capacitive accelerometer system comprising:
a plurality of digital capacitive accelerometers, each including:
a support member;

a fixed plate mounted on said support member;

a sprung plate;

resilient means for resiliently supporting said sprung plate from said support member at a rest position in spaced relationship to said fixed plate, and biasing said sprung plate for resisting an externally applied acceleration force;

a digital-to-analog converter connected to one of the two plates forming each capacitive accelerometer for applying voltage across said fixed and sprung plates;

a counter for generating an incrementing signal to increment said digital-to-analog converter to monotonically increase the voltage applied to said capacitor until a pull-in voltage is reached that is capable of producing an electrostatic force strong enough to overcome the resilient bias of said resilient means and pull said sprung plate against said fixed plate; and wherein said system further comprises means for sequentially delaying the counter of a first accelerometer of said plurality by a predetermined amount from a second accelerometer of said plurality.

12. The accelerometer as defined in claim 11, wherein each said accelerometer comprises a register to register a count of the number of times said digital-to-analog converter has been incremented, as a representation of the pull-in voltage;

a current sensing circuit for sensing the current pulse as a pull-in detection signal; and a logic circuit for receiving the pull-in detection signal from said current sensing circuit and latching the count from said register upon receipt of said pull-in detection signal for generating a digital accelerator output signal representative of the pull-in voltage, and generating a reset signal for resetting and restarting said counter.

13. The accelerometer as defined in claim 12, wherein the digital capacitive accelerometer system further comprises:

a multiplexer for receiving and combining, in time-phased relationship, a digital accelerometer output signal from each said logic circuit and for generating in response thereto a composite digital accelerometer output signal representative of the pull-in voltage of each respective digital capacitive accelerator; and a central processing unit for receiving the composite digital accelerometer output signal and generating in response thereto a digital accelerometer system output signal representative of the applied acceleration.

14. The accelerometer as defined in claim 12, wherein said logic circuit is a microcomputer.

15. The accelerometer system as defined in claim 11, wherein the mass of each of said plurality of sprung plates is greater than the mass of each of said plurality of fixed plates.

16. A method for detecting and measuring acceleration, the method comprising the steps of:

mounting a fixed plate on a support member;

providing a sprung plate;

resiliently supporting said sprung plate from said support member at a rest position in spaced relationship to said fixed plate to form therewith a capacitor, for resisting an externally applied acceleration tending to drive said fixed plate and said sprung plate together;

applying a voltage across said fixed and sprung plates;

incrementally increasing the voltage applied across said fixed and sprung plates to incrementally increase the electrostatic force thereacross until a pull-in voltage is reached that is capable of producing an electrostatic force strong enough to overcome the resilient bias of the sprung plate resilient support to pull said sprung plate against said fixed plate, resulting in the generation of a current pulse;

sensing the current pulse; and generating a representative count of the incrementally increased voltage when said current pulse is sensed.

17. The method as defined by claim 16, further comprising the steps of generating a digital accelerometer output signal in response to the representative count, and generating a reset signal for resetting said counter.

18. The method as defined by claim 16, further comprising the following steps:

multiplexing a plurality of parallel digital accelerometer output signals and generating a composite digital accelerometer output signal representative of the pull-in voltages; and processing the composite digital accelerometer output signal to generate an output signal representative of the applied acceleration.

19. The method as defined in claim 18, wherein said multiplexing includes sequentially delaying said incremental increasing of a first accelerometer of said plurality by a predetermined amount from a second accelerometer of said plurality.

* * * * *